United States Patent [19]

Rieder et al.

[11] Patent Number: 4,695,720

[45] Date of Patent: Sep. 22, 1987

[54] OPTOELECTRONIC INCREMENTAL MEASURING SYSTEM WITH ADJUSTABLE LED POSITIONING

[75] Inventors: Heinz Rieder, St. Pantaleon; Max Schwaiger, Ostermiething, both of Austria

[73] Assignee: EMR Elektronische Mess- und Regelgerate Gesellschaft m.b.H., Tarsdorf, Austria

[21] Appl. No.: 805,850

[22] Filed: Dec. 5, 1985

[30] Foreign Application Priority Data

Dec. 5, 1984 [AT] Austria ............................... 3856/84

[51] Int. Cl.[4] .............................................. G01D 5/34
[52] U.S. Cl. ............................ 250/231 SE; 250/237 G
[58] Field of Search ............. 250/237 G, 231 SE, 239; 340/347 P; 356/395

[56] References Cited

U.S. PATENT DOCUMENTS

| | | | |
|---|---|---|---|
| 4,152,589 | 5/1979 | Mitchell | 250/237 G |
| 4,224,514 | 9/1980 | Weber | 250/231 SE |
| 4,375,592 | 3/1983 | Cox et al. | 250/231 SE |

OTHER PUBLICATIONS

Europatent Application EP-A1 0076 858.

*Primary Examiner*—David C. Nelms
*Assistant Examiner*—Jessica Ruoff
*Attorney, Agent, or Firm*—Karl F. Ross; Herbert Dubno

[57] ABSTRACT

An optoelectronic incremental measuring system for measuring lengths or angles comprises a scale member provided with an incremental scale and a scanning unit, which is adjustable along the scale and comprises scanning grids, which are spaced apart by an integral multiple and a fractional part of a scale increment, a plurality of optoelectronic receivers associated with respective ones of such grids, and a plurality of light-emitting diodes, which are associated with the respective grids and adapted to illuminate the associated receiver via the scale and the associated scanning grid. In such a system a movement of the scanning unit and the scale relative to each other will cause the receivers to generate phase-displaced sine signals having periods in a number depending on the number of scale increments traversed by the scanning unit. The signals generated by the receivers can be adjusted relative to each other in amplitude and phase because the positions of the light-emitting diodes are individually adjustable.

6 Claims, 4 Drawing Figures

OPTOELECTRONIC INCREMENTAL MEASURING SYSTEM WITH ADJUSTABLE LED POSITIONING

FIELD OF THE INVENTION

This invention relates to an incremental measuring system for an optoelectronic measurement of lengths or angles, comprising a scale member carrying an incremental scale, and a scanning unit, which is adjustable along said scale and comprises scanning grids, which are spaced apart by an integral multiple and a fractional part of a scale increment, a plurality of optoelectronic receivers associated with respective ones of said grids, and a plurality of light-emitting diodes, which are associated with respective ones of said grids and adapted to illuminate the associated receiver via the scale and the associated scanning grid. In such a system a movement of the scanning unit and the scale relative to each other will cause the receivers to generate phase-displaced sine signals having periods in a number depending on the number of scale increments traversed by said scanning unit. The system comprises also means for a fine adjustment of the signals relative to each other in amplitude and/or phase.

DESCRIPTION OF THE PRIOR ART

The scales of such measuring systems may be linear or, in so-called synchros, may extend along a circle or an arc of a circle. The scanning grids are offset from each other by integral multiple of a scale increment plus predetermined fractional parts of such increment. In most cases it is desired to generate output signals which have a phase displacement of 90° from each other. Such phase displacement can be obtained in the simplest case by the provision of two properly offset grids and receivers and of illuminating means associated with said grids. In most cases, four signals having a phase displacement of 90° from each other are generated and are combined in pairs by a back-to-back coupling so that two signals in quadrature appear at the output of the scanning unit. The back-to-back coupling of pairs of signal eliminates various disturbing influences.

In dependence on the scanning method employed, the illuminating means may illuminate the optoelectronic receivers with transmitted or incident light or with reflected light. In one case the scale member is made of glass and the light-emitting diodes emit light which is transmitted through the scale and the grid before it illuminates the associated optoelectronic receiver. In that case the light-emitting diodes and the receivers are disposed on opposite sides of the scale member. Alternatively, the scale member may be provided with reflecting graduations and the grids and light sources may be disposed on the same side of the scale member. In that case the strongest signals will be generated by the associated receiver when an entire reflecting scale graduation registers with a light-transmitting area of the grid. In an arrangement which is intermediate those described above, the scale member is provided with a reflecting coating on its rear and the scale as well as the grid and the receiver disposed behind the grid are illuminated with light which comes from a light-emitting diode that is disposed on the same side as the receiver and emits light which is obliquely incident on the reflecting layer of the scale member.

A constant light flux is emitted in most cases and the phase-displaced signals which are generated may be processed in various ways. In the simplest case the direction of movement of the grids and scale member relative to each other is determined by a detection of which of the two signals leads the other. Countable signals are generated in response to the zero crossings of the phase-displaced signals and are delivered to a bidirectional counter, which counts in a direction that is controlled by a signal which indicates the direction of movement of the grids and scale member relative to each other. In that case the number of such countable signals will indicate the displacement of the scanning unit and is stored in the counter. The countable signals or signals derived therefrom may be delivered to control means for machine controls and robots. Various auxiliary circuits have been disclosed by which the scale increments can be electronically subdivided or which can be used for an interpolation of intermediate values. It is also known that the subdivision of a scale increment can be assisted by the use of a modulated rather than constant light flux and that special circuitry can be used to determine the magnitude of a fractional part of an increment that has been traversed from the phase displacement of a modulated signal that has been received because that phase displacement is proportional to the fractional part of a scale increment which has just been traversed.

An exact measurement and particularly an exact electronic subdivision will always require that the predetermined phase relation of the received signal is exactly maintained and that the signals received by the several receivers are equal in amplitude as far as possible. This means that all signals should have the same waveform and the same amplitude and that the phase relation should be maintained as exactly as possible. Various compensating circuits have been provided, by which the signals generated by the optoelectronic receivers can subsequently be shaped and can be adjusted to a predetermined phase relation. But the provision of such compensating circuits requires a change of the circuitry of the receivers and they involve the basic disadvantage that the received signals must be shaped, this may result in inaccuracies.

In similar measuring systems it is already known to provide a plurality of aperture stops, which are disposed on that side of the scale member which is remote from the grids and which precede respective grids in the path of light, and to change the size of the aperture by means of a screw, which protrudes into the aperture and is adjustable transversely to the path of light. But that concept has been proposed only for measuring systems comprising a common light source for all optoelectronic receivers, and the arrangement may be used to change the intensity of illumination of the several receivers. On the other hand, there is a risk of undesired secondary effects, particularly of a non-uniform illumination of the grid area, of a diffraction of light and of an undersired change of the phase relation of the generated signals, so that the signals must subsequently be corrected as regards their phase relation and amplitude by shaping stages which follow the receivers.

In a similar arrangement, which is known from U.S. Pat. No. 4,375,592, a disc provided with a peripheral scale is scanned through scanning windows, each of which is associated with a photoelectric receiver, which is preceded by an aperture stop. The illumination is effected by means of photodiodes associated with respective windows. In order to prevent light from a given light-emitting diode from reaching the window which is associated with an adjacent light-emitting diode, the diodes are provided with stops having apertures which taper in funnel shape from the diode diameter toward an exit facing the window. In automatic control circuits used in conjunction with a common light source it is known from U.S. Pat. No. 4,224,514 to provide a window in addition to the scanning windows and to provide a sensor for detecting the light falling through that window. That sensor is connected to the reference input of an automatic control circuit for controlling the amplification of the signals which are generated by the receivers.

OBJECT OF THE INVENTION

It is an object of the invention so to improve a measuring system of the kind described above that an exact, fine adjustment of the signals in amplitude and phase relation can be achieved by simple means.

SUMMARY OF THE INVENTION

This object is accomplished by providing means 50 that the positions of the light-emitting diodes can be individually adjusted.

The invention is based on the recognition that a simple but exact adjustment is enabled by this measure. Regarding signal amplitude, indentical components, such as light-emitting diodes, even if they are accurately made, may exhibit deviations so that the luminous flux or the luminosity distribution may vary even though the supply voltage and the arrangement are the same. Such deviations may also be caused or aggravated by an inaccurate mounting or an inaccurate manufacture. It is not possible in practice to arrange all of the light-emitting diodes exactly in the same relation to the associated grid. Even in case of very careful assembling work, one light-emitting diode may "squint" relative to the associated receiver so that the intensity of illumination and the phase displacement will differ from the corresponding parameters obtained with a light-emitting diode which is exactly aligned. The invention permits an elimination of such variations with simple means.

In accordance with a preferred feature the light-emitting diodes are adjustably mounted in a printed circuit board. The phase relation between signals generated in a receiver associated with a given light-emitting diode and the signals generated in the other receivers can be corrected by a slight change in the direction in which light is emitted by a light-emitting diode. The intensity of illumination can be changed by a change of the distance from a light-emitting diode to the associated grid, and the amplitude of the output signal of the receiver can be changed or adjusted in that manner.

In accordance with a further preferred feature the printed circuit board is made of flexibly resilient material, and adjacent to each light-emitting diode is a pin which is adapted to be adjusted along and to be fixed in a slot or a similar aperture formed in a mounting plate. In that embodiment each diode is adjusted until the signals generated by the associated receiver circuits have the desired amplitude and the desired phase relation. When the light-emitting diodes have thus been adjusted, they may be fixed in position in the mounting plate by sealing, glueing, by the application of rigid mounting bridges or by similar measures.

Rheostats for adjusting the luminous intensity of each light-emitting diode by be connected in circuit with the diodes. That measure, in combination with the adjustment of the positions of the light-emitting diodes, further improves the possibility to correct the signals and to adjust them relative to one another.

SPECIFIC DESCRIPTION

Figure 1:
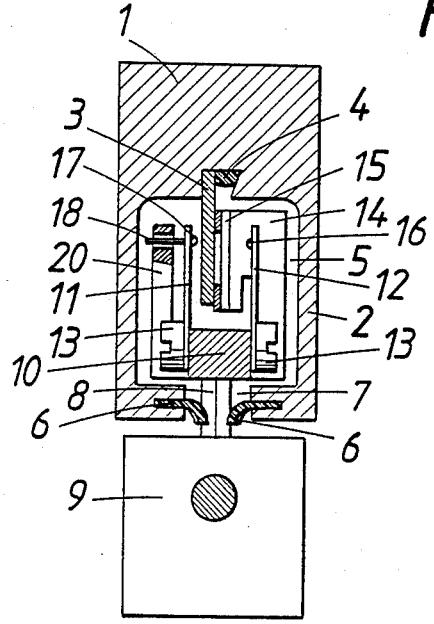
FIG. 1 is a longitudinal sectional view showing scale member provided with an incremental scale, and an associated scanning unit.

The invention is illustrated by way of example in the drawing.

Figure 2:
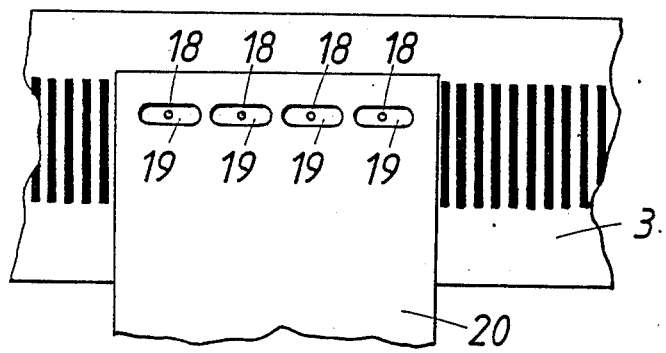
FIG. 2 is an enlarged elevation showing a detail of FIG. 1.

In accordance with FIGS. 1 and 2, a scale member 3 made of glass is contained in a tubular protective housing 2, which has a relatively thick top 1. The scale member 3 is held by means of an elastic clamping element 4 in a dovetail groove, which is formed in the underside of the top 1. One portion of the scale member 1 is provided with an incremental scale and protrudes into the cavity 5 of the housing 2. The housing 2 is formed in its bottom with a slot 7, which is lined by sealing lips 6 and receives a web 8. That web 8 is coupled to a member for performing a relative movement which is to be measured. That member may consist, e.g., of a tool slide 9. A measuring slide 10 is secured to the web 8 within the cavity 5 of the housing 2 and carries printed circuit boards 11, 12 disposed on opposite sides of the scale member 3 and secured to the slide 10, e.g., by means of screws 13. The measuring slide 10 carries a holder 14, which is disposed beside the printed circuit board 12 and to which a scanning plate 15 is attached, which is guided on the scale member 3. An element, not shown, is interposed between the scanning plate 15 and the holder 14 and permits an adjustment of the scanning plate 15 relative to the holder 14 so that the scanning plate 15 will exactly be guided by the scale member 3 because the scanning plate 15 can be transversely adjusted relative to the measuring slide 10. In the present embodiment, the scanning plate 15 carries four scanning grids, each of which is provided with a plurality of graduations having a pitch which is equal to the scale increments of the scale on the scale member 3. Said scanning grids are spaced apart in the longitudinal direction of the scale member by an arbitrarily selectable, integral number of scale increments and by a quarter of a scale increment. A receiver consisting of a phototransistor 16 is associated with each scanning grid and is illuminated through the scale and the grid from an associated light-emitting diode 17, which is mounted on the printed circuit board 11. When the scale is scanned by a movement of the scanning unit and scale member relative to each other, the signals generated by the juxtaposed phototransistors 16 will have in an ideal case a phase displacement of 90°, i.e., will have the phase angles 0°, 90°, 180° and 270°, respectively.

The measuring system described thus far is known per se. In the present embodiment the printed circuit board 11 which carries the leads for supplying power to the light-emitting diodes is made from flexibly resilient plastic sheeting. Adjacent to each light-emitting diode 17, a pin 18 is attached to the printed circuit board 11 and extends through a slot 19 formed in a mounting plate 20. Each pin 18 can slightly be tilted and/or displaced in the associated slot 19 so that the relative position of each light-emitting diode and the direction in which light is emitted by the diode can be adjusted. After that adjustment, the pin 18 and the associated light-emitting diode are fixed in position by suitable means, such as a plug of putty forced into the slot 19 or by cementing or in that the slot is filled with a cast material.

Figure 3:
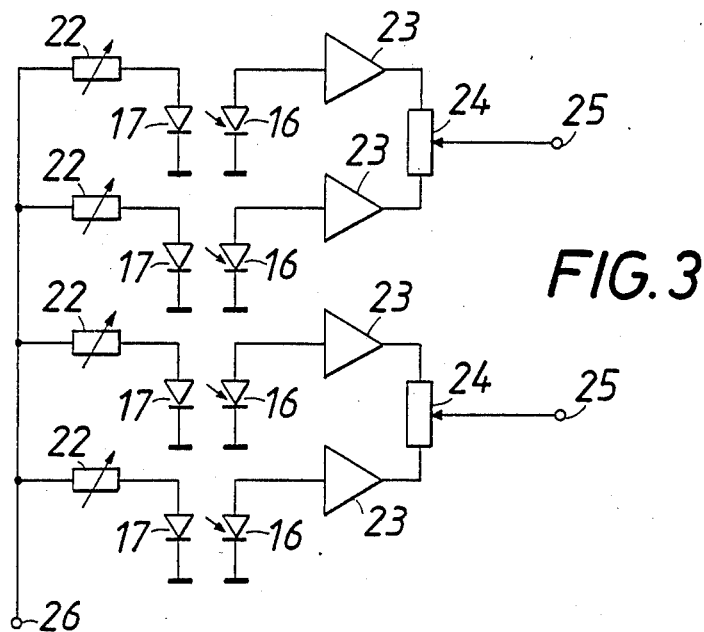
FIGS. 3 and 4 are two basic circuit diagrams of respective processing circuits.

In the embodiment shown in FIG. 3, the light-emitting diodes 17 are connected in parallel in a d.c. supply circuit. Each light-emitting diode 17 is energized through a series resistor 22, which may consist of a rheostat, a trimmer resistor or a detachably mounted, replaceable resistor. The luminous intensity of each light-emitting diode 17 can individually be adjusted by an adjustment or selection of the associated resistor 22. The signals generated by the phototransistors 16 are amplified by amplifiers 23, which are provided on the printed circuit board 12, and are then combined in pairs by means of resistors 24 providing for a back-to-back coupling so that two signals in quadrature appear at the taps 25 of the resistors 24 and are available for further processing.

Figure 4:
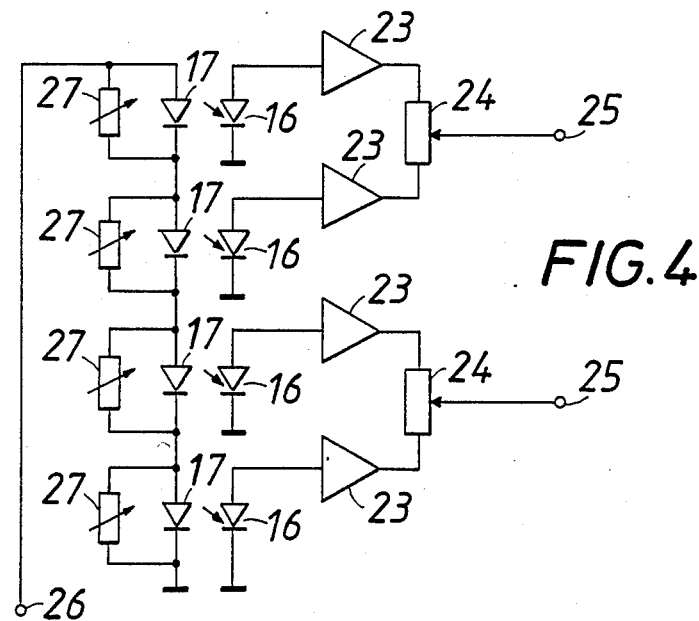

In the circuit arrangement shown in FIG. 4 the light-emitting diodes 17 are connected in series with each other in an a.c. supply circuit 26 so that the light emitted by the diodes is modulated at a predetermined frequency. For an individual adjustment of the luminous intensity of each light-emitting diode 17, the latter is shunted by a rheostat 27. The phototransistors 16 generate signals which are at the modulation frequency and are phase-modulated in response to the movement of the scanning unit relative to the scale. Said signals are amplified by amplifiers 23 and combined by resistors 24 for a back-to-back coupling to appear at the taps 25, from which they are passed through high-pass filters, on the one hand, and low-pass filters, on the other hand. The signals appearing at the output signals of the low-pass filters exhibit a modulation corresponding to the scale increments and can be transformed into countable signals. A phase discriminator circuit is connected to the outputs of the high-pass filters and in dependence on the phase displacement of the carrier signal generates additional signal groups, which correspond to fractional parts of a scale increment so that the scale increments are electronically subdivided. The signals of said groups and the countable signals are processed in a microprocessor and supplied to display or control means.

The means for mounting the light-emitting diodes 17 so that they are capable of a fine adjustment may differ from the arrangement shown. Each diode might be eccentrically mounted on a member which is rotatably mounted in a rigid printed circuit board so that the diode can be adjusted by a selected rotation of said member. To facilitate the adjustment, measuring circuits or oscilloscopes are preferably connected to the taps 25 so that the matching of the signals in amplitude and the adjustment of their phase relation effected by the adjustment of the light-emitting diodes 17 can be monitored.

We claim:

1. An optoelectronic incremental measuring system, comprising:
    a scale member provided with an incremental scale having a plurality of predetermined scale increments; and
    a scanning unit mounted for relative movement of said unit and said scale member along said scale, said scanning unit comprising:
        a plurality of scanning grids spaced apart along said scale by a distance which is an integral multiple and a fractional part of one scale increment,
        a plurality of optoelectronic receivers each associated with a respective one of said grids,
        a support,
        a printed circuit board of a flexibly resilient material,
        a plurality of light-emitting diodes mounted on said printed circuit board, each of said light-emitting diodes being positioned to cooperate with a respective one of said grids and a respective one of said receivers for emitting light which is detected by the respective receiver and is modulated by said scale and the respective grid upon said relative movement, said receivers generating relatively phase-displaced sine signals having periods which correspond in number to a number of said scale increments swept by said scanning unit upon said relative movement, and
        means for individually adjusting positions of said light-emitting diodes relative to said support by deforming said printed circuit board in a region at which the respective light-emitting diode is mounted thereon for adjusting said signals relative to one another.

2. The optoelectronic incremental measuring system defined in claim 1 wherein said scale is a linearly extending scale.

3. The optoelectronic incremental measuring system defined in claim 1 wherein said scale is an angular scale.

4. The optoelectronic incremental measuring system defined in claim 1 wherein said means for individually adjusting positions of said light-emitting diodes relative to said support includes:
    a mounting plate on said support adjacent said printed circuit board and formed with a plurality of slots; and
    a respective pin affixed to said board adjacent each of said diodes and extending through a respective one of said slots and adjustable relative to said plate to deform said printed circuit board in a region of the respective pin.

5. The optoelectronic incremental measuring system defined in claim 4 wherein a reostate is connected in circuit with each of said diodes to control a luminous intensity thereof.

6. The optoelectronic incremental measuring system defined in claim 4, further comprising means in circuit with said diodes for adjusting amplitude of said signals relative to one another.

* * * * *